United States Patent [19]

Surgant

[11] Patent Number: 4,544,693

[45] Date of Patent: Oct. 1, 1985

[54] WATER-SOLUBLE FILM

[75] Inventor: John M. Surgant, Clayton, Mo.

[73] Assignee: Monsanto Company, St. Louis, Mo.

[21] Appl. No.: 567,586

[22] Filed: Jan. 3, 1984

[51] Int. Cl.$^4$ ............................................... C08K 5/06
[52] U.S. Cl. .................................... 524/375; 524/503; 524/516; 524/555; 525/420
[58] Field of Search ............... 524/375, 516, 555, 503; 525/420

[56] References Cited

U.S. PATENT DOCUMENTS

| | | | |
|---|---|---|---|
| 3,346,530 | 10/1967 | Martins et al. | 524/375 |
| 3,374,195 | 3/1968 | Bianco et al. | |
| 3,528,921 | 9/1970 | Gray . | |
| 3,634,260 | 1/1972 | Pickin . | |
| 3,695,989 | 10/1972 | Albert . | |
| 3,892,905 | 7/1975 | Albert . | |
| 4,251,400 | 2/1981 | Columbus | 524/503 |

FOREIGN PATENT DOCUMENTS

J55064-503  5/1980  Japan .

*Primary Examiner*—Paul R. Michl
*Assistant Examiner*—Alex H. Walker
*Attorney, Agent, or Firm*—Patricia A. Coburn; Richard H. Shear

[57] ABSTRACT

The present invention is directed to water-soluble film comprising:

| Component | % By Weight |
|---|---|
| Polyvinyl Alcohol | 40–75 |
| Polyvinyl Pyrrolidone | 7.5–43 |
| Ethoxylated Alkyphenol | 7–20 |
| Polyhydric Alcohol | 7–20 |

The cold water-soluble packaging films formed from the compositions of this invention are useful for packaging of agricultural chemicals which are in granule or dust form. By containing such water dispersable granule or dust agricultural chemicals in water-soluble bag films of this invention, one is able to avoid the problem of dust which may be irritating and/or toxic to the user. Specific examples of agricultural chemicals which are usually packaged in pre-measured portions in the water-soluble films of the present invention are insecticides, herbicides, nematocides, fungicides, plant growth regulants and herbicidal antidotes. The water-soluble films of the present invention may also be useful in containing such items as laundry detergents, bleaches and caustic products; other uses would involve the containment of activated charcoal, pigments, dyes, foodstuffs and food additives.

16 Claims, No Drawings

WATER-SOLUBLE FILM

BACKGROUND OF THE INVENTION

Many agricultural chemicals are formulated as wettable powders or dusts. In using these materials, the user may breathe or be exposed to dust particles of the agricultural chemical. Thus, it highly desirable to package such materials in such a way as to reduce or eliminate user exposure to the agricultural chemical. One way of accomplishing this desirable aim is the use of a packaging material which would contain the wettable powder or dust agricultural chemical formulation while at the same time being easily disposed of and made out of relatively inexpensive materials. One type of packaging which would fill this need is a water-soluble film which could be made into a water-soluble bag. Such water-soluble films are known in the art, e.g., an example of such film was a material made by Chris Craft, Inc. called "Monosol" film. DuPont Company has marketed Lannate ® (methomyl insecticide) in a water-soluble package.

In order for such a film to be adequate as a packaging material for agricultural chemicals, the water-soluble bag formed from said film should readily disintegrate and dissolve in water, especially cold water (5° C.). Additionally, the film should readily dissolve in aqueous fertilizer solutions and it should not form a nondispersible residue in the farmer's spray tank. Accordingly, it is a particular object of this invention to form a water-soluble film which may be made into a water-soluble bag capable of containing agricultural chemicals which when the bag is mixed in an agricultural spray tank with volumes of water, readily dissolves in cold water releasing the agricultural chemical. It is another object of this invention to prepare a water soluble film which easily dissolves in a aqueous solution of nitrate fertilizers and which leaves no residue in the agricultural spray tank.

SUMMARY OF THE INVENTION

The present invention is directed to a superior water-soluble film which may readily be formed into a water-soluble bag. The water-soluble film of this invention has the following composition:

| Component | % By Weight |
| --- | --- |
| Polyvinyl Alcohol | 40–75 |
| Polyvinyl Pyrrolidone | 7.5–43 |
| Ethoxylated Alkyphenol | 7–20 |
| Polyhydric Alcohol | 7–20 |

Water-soluble packages or bags prepared from the above-described film rapidly disintegrate and dissolve in both cold and hot water. The films of this invention are readily soluble in aqueous nitrate fertilizer solutions. Further, the films of this invention are resistant to various atmospheric conditions, especially high humidity which causes conventional films to become "tacky". They withstand impacts at low temperatures, and the resistance to impact is retained in the presence of herbicides, insecticides, plant growth regulators and the like.

The films of this invention have good self-sealing properties, and remain non-tacky, clear and relatively colorless over time. Use of the films of this invention is to form packages or bags to contain various chemicals, especially agricultural chemicals, prevents exposure of the user to the contents of the package, removing potential health hazards. Also use of such packages or bags permits accurate amounts of the contents of the bag to be used without handling the contained material directly; further, many problems arising from the disposal of packages containing small amounts of the contained material as, for example, agricultural chemicals, is eliminated.

DETAILED DESCRIPTION OF THE INVENTION

As described above, the present invention is directed to a water-soluble film comprising:

| Component | % By Weight |
| --- | --- |
| Polyvinyl Alcohol | 40–75 |
| Polyvinyl Pyrrolidone | 7.5–43 |
| Ethoxylated Alkyphenol | 7–20 |
| Polyhydric Alcohol | 7–20 |

As used herein, the term "polyvinyl alcohol" refers to an hydrolyzed polyvinyl acetate having 75–99 mole percent of the acetate groups of the polyvinyl acetate replaced by hydroxyl groups and having about 1–40% by weight residual acetate. The polyvinyl alcohol useful in the present invention will be a low molecular weight polyvinyl alcohol resin having good cold water solubility and high residual acetate content.

The molecular weight of the polyvinyl alcohol should range from about 2000 to about 20,000. Polyvinyl alcohols sold under the trade name "Gelvatol 20–30", "Gelvatol 40–10", "Gelvatol 1–30", etc., by the Monsanto Company, 800 N. Lindbergh Blvd., St. Louis, Mo. 63167 are exemplary of the polyvinyl alcohols which may be used in the present invention.

"Gelvatol 20–30" has an average molecular weight of 10,000 and is 87.7–89% hydrolyzed. "Gelvatol 40–10" has an average molecular weight of 2,000 and is 72.9–77% hydrolyzed. "Gelvatol 1–30" has an average molecular weight of 14,000 and is 98.5–100% hydrolyzed. Preferred for use herein are polyvinyl alcohols having an average molecular weight of about 10,000 and about 86–90% hydrolyzed.

The polyvinyl alcohol is present in the composition at from about 40–75% by weight of the composition, preferably at from about 50–65% by weight and most preferably at from about 61–67% by weight of the composition.

The polyvinyl pyrrolidone polymer useful in the films of this invention will have a molecular weight ranging from about 10,000 to about 360,000. Such polyvinyl pyrrolidones are available from a variety of commercial sources as, for example, those sold by GAF Corporation, Chemical Products, New York, New York 10020 under the trade name PVP K-90 (360,000 MW), PVP K-30 (40,000 MW) and PVP K-15 (10,000 MW). Preferred for use herein is a polyvinyl pyrrolidone polymer (PVP) having an average molecular weight of about 10,000 to about 40,000; especially preferred is a PVP having an average molecular weight of about 10,000. Mixtures of PVP having varying molecular weights may also be used as long as the molecular weight of the mixture falls into the recommended range.

The PVP polymer is present in the composition from about 7.5–43% by weight of the composition, preferably 15–28% by weight and most preferably 15–17% by weight of the composition.

Certain wetting agents are essential to the superior films produced herein; these materials, in addition to acting as wetting agents, will also serve as partial plasticizers in the compositions of this invention. Such wetting agents are ethoxylated alkylphenols which are nonionic surfactants having an HLB ranging from about 10 to about 15. Such materials are available from the Monsanto Company, under the trade name "Sterox" DF, DJ, ND, NE, NG, NJ, NK, AND NM. Other commercially available ethoxylated alkylphenols which are also useful in the films of this invention are: FLOMO 14D, 20N and 30N manufactured by Sellers Chemical Corporation, 1320 Sams Ave., P.O. Box 23523 Harahan, La. 70183 and Polyfac NP-40 and NP-40-70, manufactured by Westvaco-Polychemicals, P.O. Box 70848, Charleston Heights, S.C. 29405.

The ethoxylated alkylphenol wetting agents will be present in the composition at from about 7–20% by weight of the composition, preferably 8–15% by weight and most preferably at 8–12% by weight of the composition.

The compositions described above will additionally contain polyhydric alcohols such as the alkylene glycols: ethylene glycol, propylene glycol, etc.; glycerol, polyglycols and sorbitol as plasticizer agents. Preferred for use herein are the alkylene glycols, especially, propylene glycol. Plasticizers improve the flexibility and resistance to cracking or flexing of the mixed polymer films of this invention. At relative humidities above about 50%, handling film containing more than about 20% by weight of the composition of plasticizer may become difficult and the film may tend to adhere strongly to itself and other surfaces. Conversely, at humidities below about 30% relative humidity and with less than 5% plasticizer, the films may become too brittle and will not be sufficiently tough for convenient operation on high speed, automatic packaging machines. The polyhydric alcohol plasticizer is present in the compositions of this invention at from about 7–20% by weight of the composition, preferably at from about 8–15% by weight and most preferably at from about 8–12% by weight of the composition.

The films of this invention were prepared as described in Example 1. The following examples illustrate various films which may be made according to the composition of this invention.

EXAMPLE 1

| Component | 25% Solution Grams | 30% Solution Grams |
|---|---|---|
| Polyvinyl Alcohol (Gelvatol 20-30) | 3.9 | 4.6 |
| Polyvinyl Pyrrolidone (PVP K-90) | 1.0 | 1.2 |
| Sterox NJ | .7 | .9 |
| Propylene Glycol | .7 | .9 |
| Water | 18.7 | 17.4 |
| | 25.0 | 25.0 |

To form a 30% solution, 17.4 grams of water was added to 4.6 g of Gelvatol 20-30, and 1.2 g of polyvinyl alcohol (PVA). The temperature of the water was maintained at about 30° C. while rapidly stirring the mixture until all components dissolved. Thereafter 0.9 g of Sterox N.J. and 0.9 g of propylene glycol were added to the polymer mixture and the mixture was stirred until all of the components were in solution. The temperature was maintained at 30° C. during this period. In a similar fashion, a 25% solution was also prepared. The mixture was cast onto a clear glass plate and thereafter placed in a drying oven set at 120° F. for 1–1½ hours to drive off the water. The film formed from both the 25% and 30% aqueous solutions had the following composition:

| Component | % By Weight |
|---|---|
| Polyvinyl Alcohol | 61.8 |
| PVP | 15.7 |
| Ethoxylated Alkyl Phenol Emulsifier | 11.25 |
| Propylene Glycol | 11.25 |
| | 100.00 |

In a similar fashion as described above, the following films were formed. In each case the films were first prepared as a 25% and/or 30% aqueous solution, cast onto glass and dried in an oven to drive off the water.

EXAMPLE 2

| Component | % By Weight |
|---|---|
| Polyvinyl Alcohol (Gelvatol 20-30) | 66.5 |
| Polyvinyl Pyrrolidone (PVP K-90) | 16.5 |
| Sterox NJ | 8.5 |
| Propylene Glycol | 8.5 |
| | 100.0 |

EXAMPLE 3

| Component | % By Weight |
|---|---|
| Polyvinyl Alcohol (Gelvatol 20-30) | 41.8 |
| Polyvinyl Pyrrolidone (PVP K-90) | 15.4 |
| Sterox NJ | 15.4 |
| Propylene Glycol | 7.7 |
| | 100.00 |

EXAMPLE 4

| Component | % By Weight |
|---|---|
| Polyvinyl Alcohol (Gelvatol 20-30) | 61.5 |
| Polyvinyl Pyrrolidone (PVP K-90) | 15.4 |
| Sterox NJ | 15.4 |
| Propylene Glycol | 7.7 |
| | 100.0 |

EXAMPLE 5

| Component | % By Weight |
|---|---|
| Polyvinyl Alcohol (Gelvatol 20-30) | 61.5 |
| Polyvinyl Pyrrolidone (PVP K-90) | 15.4 |
| Sterox NJ | 7.7 |
| Propylene Glycol | 15.4 |
| | 100.0 |

Table I summarizes the solubility and disintegration time of the film made from the compositions of the above-described examples when a 4 in² sample of film was placed in 400 ml of 2° C. St. Louis tap water. The films were 1.2 to 1.5 ml thick.

TABLE I

| Ex. No. | Disintegration Time (Sec.) | Dissolution Time (Sec.) | Visual Observation of Film |
|---|---|---|---|
| 1 | 5 | 25 | Very Pliable |
| 2 | 35 | 45 | Very Pliable |
| 3 | 20 | 35 | Slightly Brittle |
| 4 | 10 | 30 | Tacky |
| 5 | 15 | 40 | Slightly Tacky |

EXAMPLE 6

| Component | % By Weight |
|---|---|
| Polyvinyl Alcohol (Gelvatol 20-30) | 42.0 |
| Polyvinyl Pyrrolidone (PVP K-90) | 42.0 |
| Sterox NJ | 8.0 |
| Propylene Glycol | 8.0 |
|  | 100.0 |

This film was cast as described in Example 1 into a 1.5 ml thick film; a 2″×2″ (0.1 g) sample was placed in 400 ml of water at 5° C.; the sample disintegrated in 10 sec. and dissolved in 20 sec.

EXAMPLE 7

| Component | % By Weight |
|---|---|
| Polyvinyl alcohol (Gelvatol 20-30) | 67.0 |
| Polyvinyl Pyrrolidone (PVP K-90) | 17.0 |
| Sterox NJ | 8.0 |
| Propylene Glycol | 8.0 |
|  | 100.0 |

This film was cast as described in Example 1 into a 1.2 ml thick film; a 2″×2″ (0.1 g) sample was placed in 400 ml of water at 5° C.; the sample disintegrated in 10 sec. and dissolved in 25 sec.

EXAMPLE 8

| Component | % By Weight |
|---|---|
| Polyvinyl Alcohol |  |
| (Gelvatol 20-30) | 42.0 |
| (Gelvatol 40-10) | 34.0 |
| Polyvinyl Pyrrolidone (PVP K-90) | 8.0 |
| Sterox NJ | 8.0 |
| Propylene Glycol | 8.0 |
|  | 100.0 |

The film was cast as described in Example 1 into a 1.5 ml thick film; when a 2″×2″ (0.1 g) sample was placed in 400 ml of 5° C. St. Louis tap water, it disintegrated in 10 sec. and dissolved in 20 sec. The film was slightly cloudy in appearance.

EXAMPLE 9

| Component | % By Weight |
|---|---|
| Polyvinyl alcohol (Gelvatol 20-30) | 56.0 |
| Polyvinyl Pyrrolidone (PVP K-90) | 28.0 |
| Sterox NJ | 8.0 |
| Propylene Glycol | 8.0 |
|  | 100.0 |

The film was cast as described in Example 1 into a 1.5 ml thick film; when a 2″×2″ (0.12 g) sample was placed in 400 ml of 5° C. St. Louis tap water, it disintegrated in 30 sec. and dissolved in 35 sec. The film was slightly cloudy in appearance.

The compositions of this invention may be cast into films according to conventional methods known in the art. For example, the compositions may be made into films by doctor knife casting an aqueous solution of the composition onto Mylar polyester film supported on a flat glass plate. The compositions of the invention readily lend themselves to the production of water-soluble film by casting the composition on a high speed commercial band casting process. The film produced in this manner is ready for use after drying and has excellent properties.

Packages may be made from the films of this invention on many of the commercially available types of plastic film package-making machinery. Choice of such machinery and the manner of making such packages is within the skill of the art.

In order to protect the water-soluble package during storage, shipping and handling, a moisture-proof overwrap must be provided to prevent damage from atmospheric moisture such as high humidity, rain and dew and from accidental contact with water by splashing or wet hands. This moisture-proof overwrap can be provided either for individual packages or groups of packages, whichever appears to be most desirable for the individual case. Once the overwrap is removed, the soluble package must be protected from water contact or it must be used promptly.

Suitable materials for the overwrap are the polyolefin films such as polyethylene, or polypropylene, craft paper moisture-proofed with polyethylene, moisture-proof cellophane, metal foils, polyester, polyvinyl chloride, polyvinylidene chloride or waxed paper and combinations of these materials as in laminates. The choice of the overwrap would be dictated by cost and strength required and is within the skill of the art.

As noted above, the cold water-soluble packaging films of this invention are useful for packaging of agricultural chemicals which are in granule or dust form. By containing such water dispersable granule or dust agricultural chemicals in water-soluble bag films of this invention, one is able to avoid the problem of dust which may be irritating and/or toxic to the user. Specific examples of agricultural chemicals which are usually packaged in pre-measured portions in the water-soluble films of the present invention are insecticides, herbicides, nematocides, fungicides, plant growth regulants and herbicidal antidotes. It is also recognized that the water-soluble films of the present invention may also be useful in containing such items as laundry detergents, bleaches and caustic products. Other uses would involve the containment of activated charcoal, pigments, dyes, foodstuffs and food additives.

What is claimed is:

1. A composition useful for forming water-soluble film comprising:

| Component | % By Weight |
|---|---|
| a. Polyvinyl alcohol | 40.0–75.0 |
| b. Polyvinyl pyrrolidone | 7.5–43.0 |
| c. Ethoxylated alkyphenol surfactant | 7.0–20.0 |
| d. Polyhydric alcohol | 7.0–20.0 |

2. A composition according to claim 1 wherein said polyvinyl alcohol is an hydrolyzed polyvinyl acetate having about 75–99 mole percent of the acetate groups replaced by hydroxyl groups and having about 1–40% by weight residual acetate.

3. A composition according to claim 1 wherein the molecular weight of said polyvinyl alcohol is from about 2000 to about 20,000.

4. A composition according to claim 1 wherein said polyvinyl alcohol is present in the composition from about 50.0 to 65.0% by weight of the composition.

5. A composition according to claim 4 wherein said polyvinyl alcohol is present at from about 61.0 to 67.0% by weight of the composition.

6. A composition according to claim 1 wherein said polyvinyl pyrrolidone has a molecular weight of from about 10,000 to about 360,000.

7. A composition according to claim 1 wherein said polyvinyl pyrrolidone has a molecular weight of from about 10,000 to about 40,000.

8. A composition according to claim 1 wherein said polyvinyl pyrrolidone is present in the composition at from about 15.0 to 28.0% by weight of the composition.

9. A composition according to claim 1 wherein said ethoxylated alkylphenol surfactant is present in the composition at from about 8.0 to about 15.0% by weight and wherein said polyhydric alcohol is present from about 8.0 to about 15.0% by weight of the composition.

10. A composition according to claim 9 wherein said polyhydric alcohol is propylene glycol.

11. A composition useful for forming a water-soluble film comprising:

| Component | % By Weight |
|---|---|
| a. Polyvinyl alcohol | 50.0–65.0 |
| b. Polyvinyl pyrrolidone | 15.0–28.0 |
| c. Ethoxylated alkylphenol surfactant | 8.0–15.0 |
| d. Alkylene glycol | 8.0–15.0 |

12. A composition according to claim 11 wherein said alkylene glycol is propylene glycol.

13. A composition according to claim 11 wherein said polyvinyl alcohol has an average molecular weight of from about 10,000 to about 14,000 and wherein said polyvinyl pyrrolidone has an average molecular weight of from about 10,000 to about 40,000.

14. A composition useful for forming water-soluble films comprising:

| Component | % By Weight |
|---|---|
| a. Polyvinyl alcohol | 61.0–67.0 |
| b. Polyvinyl pyrrolidone | 15.0–17.0 |
| c. Ethoxylated Alkylphenol surfactant | 8.0–12.0 |
| d. Alkylene glycol | 8.0–12.0 |

15. A composition according to claim 14 wherein said alkylene glycol is propylene glycol.

16. A composition according to claim 14 wherein said polyvinyl alcohol has an average molecular weight of from about 10,000 to about 14,000 and wherein said polyvinyl pyrrolidone has an average molecular weight of from about 10,000 to about 40,000.

* * * * *